United States Patent Office 3,172,308
Patented Mar. 9, 1965

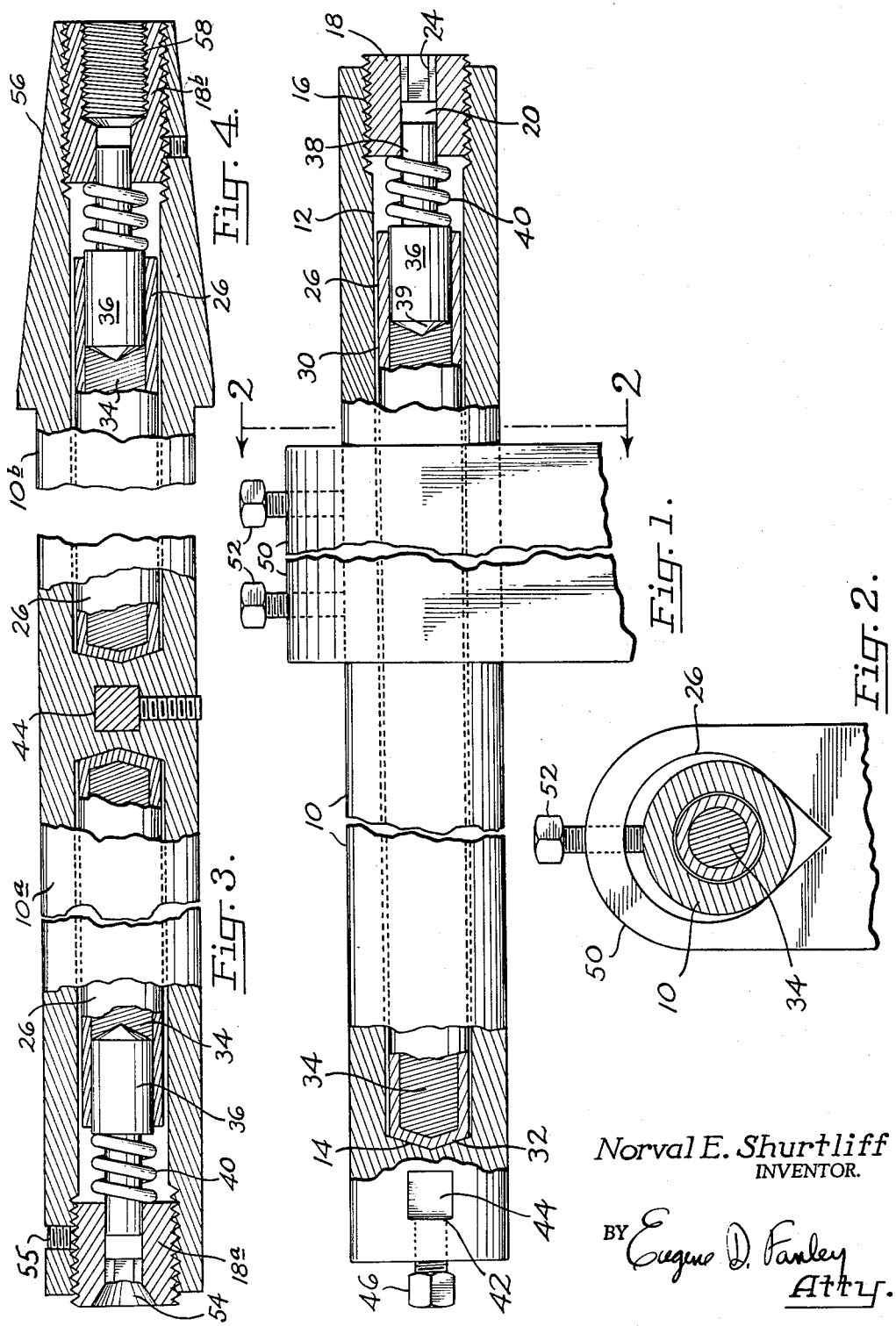

3,172,308
BORING BAR
Norval E. Shurtliff, 1219 Olympic St., Springfield, Oreg.
Filed Apr. 9, 1962, Ser. No. 186,071
2 Claims. (Cl. 77—56)

This invention relates to new and useful improvements in boring bars.

It is a well known fact that boring bars of the type which are utilized to ream holes in work pieces or for other purposes, particularly when of substantial length, tend to chatter or vibrate. Such chattering or vibration causes noisy working conditions and also results in poor machining. In order to overcome these disadvantages, it is required that the work feeding operation, whether it be the advancement of the tool relative to the work piece or vice versa, be accomplished at a slow rate. This of course slows production.

A primary object of the present invention is to overcome the disadvantages enumerated above and more particularly to provide a boring bar of a construction which does not chatter or vibrate, thereby to produce a smooth cut and permit operation at higher speeds and consequently to improve the quality of machining and also to increase production.

Another object is to provide a boring bar of the type described having stabilizing means to eliminate chatter or vibration, which stabilizing means have compression control means to vary its efficiency according to the length of bar being utilized and the speed of rotation of the boring bar.

Briefly stated, the present boring bar comprises a tubular casing in which is incorporated a stabilizing rod which in a preferred construction is supported at its ends interiorly of the casing and its side walls spaced from the inner surface of the casing. Longitudinal compression means are associated with the stabilizing rod and such compression means are adjustable to vary the efficiency of the stabilizing rod according to the length of bar utilized and the speed of rotation of the bar.

The invention will be better understood and additional objects will become apparent from the following specification and claims considered together with the accompanying drawings, wherein the numerals of reference indicate like parts and wherein:

FIG. 1 is a foreshortened elevational view, with parts broken away, of a boring bar embodying the features of the present invention;

FIG. 2 is a sectional view taken on the line 2—2 of FIG. 1;

FIGS. 3 and 4 are foreshortened elevational views, with parts broken away, of modified forms of the invention.

With particular reference to the drawings and first to FIGS. 1 and 2, which show a first form of the invention, the present boring bar comprises an elongated tubular casing 10 having a central longitudinally extending bore 12. Bore 12 extends inwardly from one end of the casing and terminates short of the other end. The closed or inner end of bore 12 terminates in a tapered wall portion or recess 14 and the open or outer end is threaded at 16 to receive an externally threaded nut 18. Nut 18 has a central bore 20 the outer end of which is provided with adjusting tool engaging means 24 such as an Allen head.

Contained in the bore 12 is a stabilizing rod 26 which in a preferred form is of tubular shape and is slightly smaller diameter than the diameter of bore 12 whereby to provide a space 30 between its outer surface and the casing 10. The inner end 32 of rod 26 is closed and such end is tapered whereby to seat in the tapered end of the bore 12, thereby positioning the inner end of stabilizing rod coaxially in the bore to provide for a uniform circumferential spacing in the latter. Casing 26 is filled with a heavy metal core such as lead 34.

Pressed into the outer end of the casing 26 is a plug member 36 having a shank 38 engageable in the bore 20 of nut 18, such shank having a slidable engagement in the bore. The inner end of plug member 36 is tapered at 39 for accomplishing a laterally secured connection with the core 34.

Mounted on the shank 38 between the plug member 36 and nut 18 is a compression spring 40 which is adapted through the medium of adjusting nut 18 to vary the longitudinal compression on the stabilizing rod 26.

Mounted in a transverse aperture 42 adjacent the forward end of the boring bar and projecting laterally from the bar is a cutting tool 44. This tool is anchored in desired laterally projecting positions by a set screw 46. The bar of FIG. 1 is adapted for securement in a holder 50 mounted on a lathe carriage or the like which is adapted to move the bar longitudinally and into engagement with a longitudinally stationary but rotating work piece. Securement of the bar in the holder is accomplished by suitable means such as by set screws 52.

In operation of the bar of FIG. 1 it is mounted in the holder 50 with its cutter end projecting a desired distance out of the holder. The bar is thus movable with the holder and is caused to engage a rotating work piece for reaming a bore in the latter. The stabilizing rod 26 serves to eliminate chatter or vibration which normally exists in this type of bar. Such improvement in operation is believed to result from a dampening effect produced by the heavy rod 26 and also from an equalizing effect which the members 10, 26 have on the other. The result is that the bar operates smoothly and thus can be rotated at higher speeds. Furthermore, the cutting can be projected a greater distance from the point of support.

Nut 18 is adjusted for the purpose of varying the compression applied by spring 40 against the rod. The compression of spring 40 being varied empirically for accomplishing smooth, non-chattering and vibration-free operation of the bar, depending upon the speed of rotation of the bar, the width of the cutting tool, the overhanging length of the bar, and other factors.

FIGS. 3 and 4 show modified forms of the present bar. FIG. 3 illustrates a bar 10a which employs a cutting tool 44 centrally thereof and a pair of stabilizing rods 26 disposed on each side thereof. The structure of the rods 26 is identical to that of FIG. 1, employing the lead core 34, plugs 36, and springs 40.

The bar of FIG. 3 employs end nuts 18a which have sockets 54 for engagement in the head and tail stock of the lathe. Thus, in this embodiment the bar 10a may be mounted for rotation and the work piece advanced relative thereto. Securement of nut 18a in adjusted position is accomplished by a set screw 55.

FIG. 4 illustrates a bar 10b which also is similar to FIG. 1 but has a tapered head portion 56 which permits mounting of the bar in a milling machine, boring machine, or the like. For this purpose nut 18b has an internally threaded bore portion 58 for the reception of the usual securing bolt. Rotatable adjustment of the nut 18b may be accomplished by threading a bolt in the bore 58 and binding a lock nut on the bolt against the end of nut 18b wherein the latter nut is rotatable with the bolt.

It is to be understood that the forms of my invention herein shown and described is to be taken as a preferred example of the same and that various changes in the shape, size and arrangement of parts may be resorted to without departing from the spirit of my invention or the scope of the subjoined claims. For example, the bar may take other forms which accommodate its mounting in various other types of tool holders. Also, the stabilizing bar 26 may be composed of a solid rod rather than a tubular casing and a core portion 34. In addition, the bore 12 may be filled solid with a core member to produce satisfactory results.

Having thus described my invention, I claim:

1. A boring bar comprising an elongated casing having means for supporting a cutting tool, the casing having an axial bore extending inwardly from one end thereof and terminating adjacent the cutting tool supporting means, an elongated stabilizing rod in the bore having a cross section smaller than the bore, the end of the bore and rod adjacent the cutting tool supporting means having matching tapers whereby to maintain the rod centered in the bore, support means mounted on the casing at the opposite end of the bore for longitudinal adjustment relative to the rod, the support means slidably supporting the adjacent end of the rod for maintaining the latter centered in the bore and affording relative longitudinal movement of the support means and rod, and resilient compression means interposed between the support means and rod for varying the compression of the rod by longitudinal adjustment of the support means.

2. A boring bar comprising an elongated casing having means for supporting a cutting tool, the casing having an axial bore extending inwardly from one end thereof and terminating adjacent the cutting tool supporting means, an elongated stabilizing rod in the bore having a cross section smaller than the bore, the end of the bore and rod adjacent the cutting tool supporting means having matching tapers whereby to maintain the rod centered in the bore, an adjustment nut threaded onto the casing at the opposite end of the bore for longitudinal adjustment relative to the rod, the adjustment nut having a central opening, a plug member secured to the rod and having a shank portion slidably received in the opening of the adjustment nut whereby the latter maintains the adjacent end of the rod centered in the bore, and a compression spring encircling the shank portion and interposed between the rod and adjustment nut for varying the compression of the rod by longitudinal adjustment of the nut.

References Cited in the file of this patent
UNITED STATES PATENTS

| | | |
|---|---|---|
| 2,051,954 | Leland | Aug. 25, 1936 |
| 2,591,115 | Austin | Apr. 1, 1952 |
| 2,656,742 | Poole | Oct. 27, 1953 |
| 2,882,763 | Fry | Apr. 21, 1959 |
| 2,960,189 | Osburn | Nov. 15, 1960 |